United States Patent [19]

Van Gossum et al.

[11] Patent Number: 4,478,907
[45] Date of Patent: Oct. 23, 1984

[54] AQUEOUS COPOLYESTER DISPERSIONS SUITED FOR THE SUBBING OF POLYESTER FILM

[75] Inventors: Lucien J. Van Gossum, Kontich; August M. Mariën, Oevel; Walter F. De Winter, 's-Gravenwezel; Etienne A. Van Thillo, Essen, all of Belgium

[73] Assignee: AGFA-Gevaert N.V., Mortsel, Belgium

[21] Appl. No.: 436,672

[22] Filed: Oct. 26, 1982

[30] Foreign Application Priority Data

Nov. 2, 1981 [GB] United Kingdom ................. 8132936

[51] Int. Cl.$^3$ ..................... B32B 5/16; B32B 27/06; G03C 1/78
[52] U.S. Cl. .................................. 428/327; 428/351; 428/448; 428/451; 428/459; 428/480; 428/482; 430/532; 430/533
[58] Field of Search ............ 428/331, 327, 459, 478.2, 428/451, 448, 480, 910, 482

[56] References Cited

U.S. PATENT DOCUMENTS

| | | | |
|---|---|---|---|
| 4,328,283 | 5/1982 | Nakadate et al. | 428/480 |
| 4,350,807 | 9/1982 | McConnell et al. | 428/480 X |
| 4,394,442 | 7/1983 | Miller | 428/480 X |

Primary Examiner—Patricia C. Ives
Attorney, Agent, or Firm—William J. Daniel

[57] ABSTRACT

An aqueous copolyester dispersion suitable for the subbing of polyester film without use of organic solvents wherein the copolyester contains recurring ester groups derived from ethylene glycol and an acid mixture essentially consisting of 20 to 60 mole % of isophthalic acid, 6 to 10 mole % of sulphoisophthalic acid whose sulfo group is in salt from, 0.05 to 1 mole % of an aromatic polycarboxylic acid compound having at least three carboxylic acid groups, which compound is not capable of forming intramolecularly an anhydride and includes at least two carboxylated aromatic nuclei, and the balance of terephthalic acid; the copolyester has a glass transition temperature of at least 50° C. and an intrinsic viscosity of from 0.15 to 0.45 dl/g when measured at 25° C. in a mixture of phenol/o-dichlorobenzene (60/40 by volume).

11 Claims, No Drawings

AQUEOUS COPOLYESTER DISPERSIONS SUITED FOR THE SUBBING OF POLYESTER FILM

The present invention relates to aqueous copolyester dispersions suited for the subbing of polyester film subbed with said dispersions, polyester film and photographic materials containing a thus subbed polyester base.

In order to ensure a good adhesion of a hydrophilic layer such as a photographic gelatin-silver halide emulsion layer to a polyester film support, adhesive layers known as subbing layers are applied between the support and the emulsion layer. In most cases two intermediate layers are needed. The first adhesive layer is coated directly onto the support and is normally called "primer layer". The second adhesive layer coated onto the primer layer is normally a subbing layer containing a great deal of hydrophilic colloid such as gelatin.

To give a sufficiently high dimensional stability and mechanical strength to the polyester film support it is necessary, as is generally known, to orient the film biaxially and heat-set it at relatively high temperature. This biaxial orienting can be performed by subjecting the film simultaneously to a longitudinal and transversal stretching, usually, however, by stretching the film first in one direction and afterwards in a direction perpendicular to the first. In practice, the longitudinal stretching is carried out first. This stretching of the film up to 3 to 5 times the original dimensions is performed at a temperature ranging between the glass transition temperature and the softening temperature of the polyester. In the case of films of polyethylene terephthalate the stretching is usually performed between 80° and 90° C.

After the biaxial stretching the film is conducted through a heat-setting zone wherein the film is heated until a temperature between 180° and 220° C. is reached, the film being kept under tension in both directions. In this way a dimensionally stable fully clear polyester film is obtained.

A method applied for coating the above-mentioned two adhesive layers comprises the application of an aqueous solution or dispersion of a resin or mixture of resins between the longitudinal stretching and the transversal stretching of the polyester support to form the primer layer, and the application of a gelatin-containing subbing layer after the film support carrying the primer layer has been stretched transversally and heat-set.

The technique of using an aqueous polyester or copolyester dispersion for forming a primer layer has been described in the United Kingdom Patent Specification No. 1,589,926 filed Mar. 7, 1978 by Bexford Ltd.

The polyester or copolyester contains free acid groups e.g. carboxyl or sulpho groups which groups by addition of alkali or an amine are transformed in salt form, the amount of these groups being not sufficient to make the polyester or copolyester water soluble but enough to make it water dispersable.

The polyester or copolyester is prepared starting from an organic acid having at least three acid groups. Alternatively instead of the acid a corresponding acid anhydride or lower alkyl ester of the acid can be used. Suitable acids for such preparation are trimellitic acid, pyromellitic acid, sulphoterephthalic acid, sulphoisophthalic acid and benzophenone tetracarboxylic acid and the anhydrides thereof and further trimesic acid (1,3,5-benzene tricarboxylic acid) from which no intramolecular anhydride can be formed.

As preferred polyacids or derivatives thereof trimellitic anhydride and sulpho terephthalic acid are mentioned.

In a particular embodiment subbing proceeds by coating a polyester support with a 30% by weight aqueous dispersion of a copolyester produced from isophthalic acid, diethylene glycol and a sulpho derivative of a dicarboxylic acid such as sulphoterephthalic acid or sulphoisophthalic acid. This copolyester is sold under the trade name "EASTMAN WD SIZE" and has a glass transition temperature (Tg) of 37° C.

Bifunctional acids such as isophthalic acid are intended as modifying agents for influencing the properties of the polyester or copolyester such as stickiness, flexibility, solubility, resistance against hydrolysis and glass transition temperature (Tg). Other modifying agents are carboxy glycols, polyfunctional alcohols, amines and aminoalcohols.

From the United States Patent Specification No. 3,563,942 of Philip Heiberger, issued Feb. 16, 1971 linear copolyesters are known for producing adhesives useful in the production of laminates. These copolyesters comprise the reaction product of substantially equimolar equivalents of dicarboxylic acids and at least one dihydric alcohol. The dicarboxylic acid equivalents are supplied by a plurality of acid reactants which, based on a total of 100% (molar) acid equivalents, includes at least about 0.1% (molar) equivalents of a sulphonated aromatic dicarboxylic acid or lower alkyl ester thereof preferably 0.5 to 2.5 molar percent of sodium dimethyl-5-sulphoisophthalate. These linear copolyesters are suited for forming an aqueous dispersion by so-called post-emulsification. Post-emulsification is accomplished by dissolving the solid copolyesters in an organic solvent, adding water and a surfactant to the solution to form an emulsion, and then evaporating the organic solvent. Consequently, this technique of post-emulsification for making an aqueous dispersion of polymer does not exclude the use of solvents which may pose fire hazards, may have toxic properties and are rather expensive.

According to the European Patent Application published under No. 0029620 filed Oct. 20, 1980 by Agfa-Gevaert N.V., it has been found that stable aqueous copolyester dispersions suitable for application as a subbing layer on polyester film without use of organic solvents can be prepared with a copolyester essentially consisting of recurring ester groups derived from ethylene glycol and a mixture of terephthalic acid, isophthalic acid and sulphoisophthalic acid whose sulpho group is in salt form, wherein the acid mixture contains from 20 to 60 mole % of isophthalic acid and from 6 to 10 mole % of sulphoisophthalic acid, the remainder being terephthalic acid, the copolyester having a glass transition temperature above 45° C. and an intrinsic viscosity of from 0.15 to 0.45 dl/g when measured at 25° C. in a mixture of phenol/o-dichlorobenzene (60/40 by volume).

In the preparation of the above copolyester a commercially available sulphoisophthalic acid dimethylester sodium salt was used and the intended glass transition temperature (Tg-value) above 45° C. in the final copolyester is readily obtained. On changing, however, to a sulphoisophthalic acid dimethyl ester sodium salt obtained from another manufacturer it proved impossible to obtain this relatively high Tg-value by the usual polycondensation reaction above 240° C. An analysis of the former commercial sulphoisophthalic acid dimethyl ester sodium salt revealed that this product was not very pure and yielded on recrystallization a residue which when added to the latter and more pure product of the other manufacturer resulted again in the production of copolyesters having a Tg value above 45° C. On the assumption that compounds with more than two carboxylic acid groups were responsible for the increase in the Tg value a test program was started wherein other aromatic compounds with at least three carboxylic acid groups were added in minor amounts (less than 5 mole % based on the total amount of acid) to the polycondensation reaction mixture of ethylene glycol and the dimethyl esters of isophthalic acid, terephthalic acid and pure 5-sulphosisophthalic acid, such mixture having proportions in the molar ranges specified in published European Patent Application. From the results of this test program we concluded that minor amounts of aromatic polycarboxylic acids having at least three carboxylic acid groups not capable of forming intramolecularly an anhydride and including at least two carboxylated aromatic nuclei e.g. benzene nuclei are suited particularly for producing copolyesters with a Tg value above 50° C. The synthesis of these copolyesters proceeds by the common two-step preparation technique for polyesters viz. by esterification starting from the free carboxylic acids and polycondensation, or by transesterification of e.g. the lower alkyl esters of the acids and polycondensation.

So, according to the present invention stable aqueous copolyester dispersions suitable for application as a subbing layer on polyester film without use of organic solvents are prepared with a copolyester containing recurring ester groups derived from ethylene glycol and an acid mixture containing terephthalic acid, isophthalic acid and sulphoisophthalic acid whose sulpho group is in salt form, characterized in that the acid mixture consists essentially from 20 to 60 mole % of isophthalic acid, from 6 to 10 mole % of said sulphoisophthalic acid salt, from 0.05 to 1 mole % of an aromatic polycarboxylic acid compound with at least three carboxylic acid groups which is not capable of forming intramolecularly an anhydride and includes at least two carboxylated aromatic nuclei e.g. benzene nuclei, and the remainder of said acid mixture being terephthalic acid; the copolyester having a glass transition temperature of at least 50° C. and an intrinsic viscosity of from 0.15 to 0.45 dl/g when measured at 25° C. in a mixture of phenol/o-dichlorobenzene (60/40 by volume).

The determination of the Tg value proceeded according to the technique described in the article "Thermal Analysis by a Constant Heat Flow" by Ed. Steffens in Journal of Applied Polymer Science Vol. 12 pp. 2317–2324 (1968) but having one of the temperature measuring thermocouples directly dipped into the polymer sample instead of attached to the stainless steel cover of the container containing the sample as illustrated in FIG. 1 of that article.

Due to this change in measuring conditions the obtained Tg values are slightly lower than those obtained before and mentioned in the Table of published European Patent Application No. 0029620.

The sulphoisophthalic acid is preferably not used as such in the synthesis but as the sulpho salt particularly containing the group —SO$_3$M wherein M is an alkali metal or an onium group e.g. ammonium or and organic onium.

Preferred Tg increasing compounds are aromatic polycarboxylic acids with at least four carboxylic acid groups not capable of forming intramolecularly an anhydride e.g. compounds corresponding to the following general formula I including the corresponding esters:

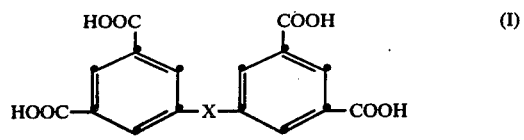

wherein X represents a chemical bond or a bivalent atom or bivalent group of atoms e.g. oxygen, alkylene such as methylene, carbonyl, sulphonyl, —NHSO$_2$—, —NHCONH— or a —NH—Q—Y—Q—NH-group wherein Q represents carbonyl or sulphonyl and Y represents a bivalent organic group e.g. a bivalent aliphatic or aromatic group. The introduction of carboxylic acid groups may proceed on the aromatic nuclei already linked by —X— through techniques known in the art.

According to another method the aromatic nuclei already containing the carboxylic acid or ester groups are linked through the —X— group by a condensation reaction starting from 5-amino-isophthalic acid or its corresponding lower alkyl ester e.g. dimethyl ester and the proper acid chloride to yield the bivalent —X— bond.

For illustration purposes the preparation of the polycarboxylic acid methyl ester of structural formula A appearing hereafter in Example 3 is given.

In a 1-liter round-bottomed flask with a stirrer, a reflux-condenser, a thermometer and dropping funnel were introduced 41.8 g (0.2 mole) of 5-amino-isophthalic acid dimethyl ester, 18.48 g (0.22 mole) of sodium hydrogen carbonate and 400 ml of anhydrous acetone. The mixture is heated under reflux for a short time and then cooled down again to room temperature. At that temperature 15.5 g (0.1 mole) of succinylchloride dissolved in 25 ml of anhydrous acetone were added dropwise whilst stirring. The reaction product precipitated during that operation. The whole mixture was then kept stirring for 1 h at room temperature and for 1 h at reflux temperature. Thereupon the reaction mixture was cooled in ice and the precipitated reaction product separated by suction filtering and dried in vacuum.

Yield=61 g. The crude product was purified by washing with water and recrystallization from dimethylformamide.

In the polycondensation reaction for forming the present copolyester the above polyfunctional carboxylic acids act to some degree as cross-linking agents and thereby increase the Tg-value of the final copolyester without impairing its dispersibility in water when the indicated molar amount of sulphoisophthalic acid or its salt is used in the polycondensation reaction. Indeed, the particular proportions of sulpho groups and the degree of polycondensation, indicated by the intrinsic viscosity, provide the required dispersibility in water of the copolyester.

Since the increase of the Tg-value is directly linked to the degree of cross-linking one could conclude thaat the use of polyols with more than two free hydroxyl groups would give the same result as the polyacids. Such however, proved to be non-practical since higher amounts of these polyols had to be used and in the transesterification were removed only partly again yielding insufficiently reproducible results. As can be learned from the Table I minor amounts (less than 5 mole %) of polyols such as pentaerythritol or glycerol did not yield a Tg-value of at least 50° C.

As is well known, the formation of an ester from an alcohol and an acid is a condensation reaction whose stoichiometry is 1/1 on a molar basis. In practice, however, an amount of dihydric alcohol, in this instance ethylene glycol is used in excess up to 70 to 100 molar % in the reaction mixture which excess is distilled off during esterification and polycondensation.

Although ethylene glycol is preferably used as the sole diol in the preparation of the present aqueous copolyester dispersions minor amounts (e.g. up to 5 mole %) of other diols may be used with the proviso that the required Tg value, intrinsic viscosity and dispersibility are still obtained. Diols in their broad definition for use according to the invention are dihydric alcohols or functional derivatives thereof such as esters, which are capable of condensing with polyacids or their functional derivatives to form condensation polymers. Exemplary diols other than ethylene glycol suitable for use in such minor amounts are diethylene glycol, 1,3-propanediol, 1,4-butanediol, 2-methyl-1,5-pentanediol, neopentylglycol, 1,4-cyclohexanedimethanol, norcamphanediols, p-xylene glycol and corresponding alkyl esters thereof.

The polycondensation proceeds advantageously in a melt, preferably in the range of 250° to 280° C., of the reactants in the presence of a catalyst used for that reaction, e.g. zinc acetate-dihydrate and antimony(III) oxide, as described for example in United Stated Patent Specification No. 3,054,703 of Donald Eugene Brasure, issued Sept. 18, 1962 and germanium(IV)oxide which is also known for that purpose.

Particularly stable aqueous copolyester dispersions containing particles of average size not greater than 50 nm can be obtained with present copolyesters having an intrinsic viscosity of 0.20 to 0.45 dl/g measured at 25° C. in a mixture of phenol/o-dichlorobenzene (60/40 by volume).

The aqueous copolyester dispersion (latex) used for subbing purposes according to the present invention may be prepared by introducing the copolyester in powder or granular form, optionally together with a dispersing agent, into water and raising the temperature above its glass transition temperature with stirring until a latex is obtained containing dispersed copolyester particles whose preferred mean size is not larger than 50 nm.

By means of such dispersing techniques stable copolyester latexes having a concentration of up to 35% by weight of copolyester can be obtained.

The present invention includes also polyester film material coated with the above copolyester applied from an aqueous dispersion free from organic solvents. A preferred polyester film material used as support, e.g. in photographic material, is polyethylene terephthalate. Although the Examples hereinafter set forth are directed to the subbing of a polyethylene terephthalate film base, other polyester films may be used, e.g. polyesters resulting from the polycondensation of glycol or mixture of glycols, with terephthalic acid or mixtures of terephthalic acid with minor amounts of other dicarboxylic acids such as isophthalic acid, diphenic acid and sebacic acid. The polyester film may contain pigments or dyes and when used as base for X-ray film is, e.g., tinted blue.

The aqueous copolyester dispersion may be applied to the polyester film support either before or after it has been stretched or oriented. Preferably, however, it is applied before longitudinal stretching the film, e.g. in the temperature of from 80° to 100° C. with a stretch ratio in the range of 2.5:1 to 4.0:1.

If desired adhesion-improving agents may be incorporated in the aqueous dispersion in dissolved form, e.g. resorcinol, pyrocatechol, dihydroxytoluene, and chloral hydrate. Other useful ingredients that may be added are, e.g., surface-active coating agents, colloidal silica and "embossing agents" i.e. particles for creating microscopic protrusions of less than 3 μm for obtaining a thin air space between the subbed material and a material touching it, e.g. during transport of the film. Such "embossing agents" can be known matting agents, e.g. those described in the published European Patent Application No. 79/200053.1 filed Jan. 30, 1979 by Agfa-Gevaert N.V. After the coating and drying of the aqueous copolyester dispersion forming a primer layer and the longitudinal stretching of the primed polyester film, normally a second subbing layer mainly containing gelatin and plasticizer(s) for allowing an easy transversal stretching is coated onto the primer layer before transversal stretching. After drying of the second subbing layer(s) stretching in the transverse direction may be effected, e.g., at a draw ratio of 2.5:1 to 4.0:1. Thereupon the film is heat-set by heating in the range of 180° C. to 220° C. for 0.1 to 2 minutes while it is restrained from shrinkage in both directions.

The aqueous gelatin coating composition used for forming the second subbing layer for photographic silver halide materials contains plasticizers that are photographically inert and that have the property of making gelatinous layers stretchable without impairing their transparency as described, e.g. in the United States Patent Specification No. 3,988,157 of August Jean Van Paesschen and Lucien Janbaptist Van Gossum, issued Oct. 26, 1976. In this respect are mentioned aliphatic polyhydroxy compounds such as glycerol, sorbitol, tri(β-hydroxy-ethyl)-glycerol, 1,1,1-tri(hydroxymethyl)-propane, 2-nitro-2-ethyl-1,3-propanediol, 1,3-dichloro-2-propanol, 1,2,4-butanetriol, 3-hydroxymethyl-2,4-dihydroxypentane, 1,2,6-hexanetriol, 2-hydroxymethyl-4-hydroxyamyl alcohol, glycerol-aldehyde, glycerol dichlorohydrin, and mannitol.

Equally suitable compounds are caprolactam, N,N'-dimethylurea resorcinol, pyrocatechol, and dichlorodiethyl ether. Other suitable plasticizers are aliphatic carboxylic or sulphonic acids such as malonic acid, glutaric acid, adipic acid, azelaic acid, sebacic acid, mono- and di-chloro-acetic acid, 1,2,3-propene-tricarboxylic acid, trimellitic acid, arylic acid, methacrylic acid, maleic acid, fumaric acid, itaconic acid, and 2-sulpho-ethyl methacrylate; further aromatic acids such as phthalic acid, o-sulphobenzoic acid, o-nitrobenzoic acid, o-aminobenzoic acid, p-hydroxybenzoic acid, and salicylic acid.

Moreover, polymeric plasticizers can be added to the gelatin coating composition, e.g. latices of copolymers of butadiene and a lower alkyl ester of acrylic or methacrylic acid e.g. a copolymer of butadiene and methyl methacrylate containing 20–80% by weight of methyl methacrylate. These latices have been described in the United Kingdom Patent Specification No. 1,053,043 filed Jan. 23, 1964 by Gevaert Photo-Producten N.V.

Hardening agents, spreading agents, antistatic or metal-complexing agents can also be added to the aqueous gelatin-containing coating composition. Suitable antistatic or metal complexing agents are the sodium salt of polystyrene sulphonic acid, alkali metal salts of co(-styrene/maleic acid), inorganic salts such as sodium chloride, potassium chloride, and sodium orthosilicate, further citric acid, sulphosalicylic acid, 2,5-disulphohydroquinone, the sodium salt of ethylenediamine tetraacetic acid, ethanol-amino-diacetic acid, the sodium salt of N(o-hydroxybenzyl)-amino-diacetic acid, the monosodium salt of vanadic acid, 3,5-disulphopyrocatechol, phosphono-acetic acid, ethylene-1,2-diphosphonic acid, butylene-1,4-disphosphonic acid, and ascorbic acid.

Other possible ingredients for the second subbing layer are, e.g. surface-active coating aids, colloidal silica, and the already mentioned embossing agents.

After the film base has been heat-set a photographic material may be formed by applying a light-sensitive layer such as a gelatin silver halide emulsion layer optionally directly to the primer layer but preferably onto the second subbing layer mainly containing gelatin. The invention includes such a silver halide photographic film but is not restricted thereto.

The second subbing layer mainly containing gelatin and plasticizer(s) may be omitted when the layer to be adhered does not contain mainly gelatin but includes a less hydrophilic binding agent. Such layers which adhere directly to the presently primed polyester film contain e.g. polymers or copolymers including free carboxylic acid groups.

These less hydrophilic polymers and copolymers may be used as polymeric binder material for a dye or pigment applied in alkali-soluble antihalation layers as described e.g. in the United Kingdom Patent Specification No. 1,380,052 filed Jan. 8, 1975 by Agfa-Gevaert N.V. relating to a motion picture film material including a magnetic recording stripe anchored to such antihalation layer by a cross-linking reaction.

Apart from light-sensitive hydrophilic colloid layers any non-light-sensitive hydrophilic colloid layer e.g. a gelatin antihalation layer can be adhered very well to the present subbed polyester support. The hydrophilic colloid layer may contain as photosensitive substances photosensitive silver halide grains, photosensitive iron salts or complexes e.g. iron(III)ammonium oxalate or diazonium compounds.

The composition of the photographic silver halide emulsion layers may be of any type known to those skilled in the art and for their composition preparation and coating reference is made, e.g. to Research Disclosure 17,643 of December 1978.

The preparation of the copolyesters suitable for use according to the invention is illustrated by the following preparation.

A reaction mixture of:

| | |
|---|---|
| 1028.2 g of dimethyl terephthalate | (5.285 moles) |
| 776 g of dimethyl isophthalate | (3.985 moles) |
| 207.2 g of 5-sulphoisophthalic acid dimethyl ester sodium salt | (0.7 mole) |
| a polycarboxylic acid methyl ester with at least three esterified carboxylic acid groups derived from a compound according to general formula (I) | |
| 1240 g of ethylene glycol | (20 moles) |
| 220 mg of zinc acetate dihydrate and | (0.03 mole) |
| 292 mg of antimony (III) oxide | | was heated to 160° C. while stirring in a nitrogen atmosphere.

At that temperature re-esterification took place and methanol was distilled. Gradually the temperature was raised to 250° C. over a period of 3 to 4 h, until no methanol distilled anymore. Thereupon the temperature was further raised to 255° C. and the reaction mixture subjected to a reduced pressure of 0.1–0.2 mm Hg. Under these conditions the polycondensation took place within a period of about 60 to 100 min. After cooling the solidified copolyester was milled and obtained in powder form. Depending on the time of polycondensation the intrinsic viscosity [$\eta$] of the copolyester was from 0.20 to 0.30 dl/g measured at a temperature of 25° C. in a mixture of phenol and o-dichlorobenzene (60/40 by volume).

The preparation of a stable aqueous copolyester dispersion (latex) for use according to the present invention was carried out as follows:

In a 1-liter round-bottomed flask a mixture of 100 g of the above copolyester in powder or granular form, 20 ml of a 10% by weight solution in water of HOSTAPAL BV (trade name of Farbwerke Hoechst-W. Germany for a 30% by weight aqueous solution of

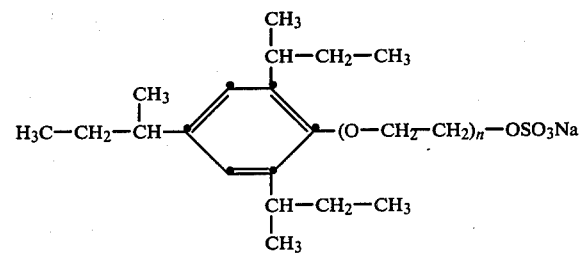

where n=7 to 8) and 400 ml of water was heated to 95°–97° C. while stirring (stirrer speed about 400 rpm). The mixture was kept at that temperature while stirring until the viscosity became equal to or lower than 10 mPa.s at 20° C. and the average particle size reached a value equal to or smaller than 50 nm. After cooling to room temperature (20° C.) a stable aqueous dispersion of the copolyester was obtained.

For comparative purposes different copolyesters prepared analogously to the above example are listed with their Tg-value and intrinsic viscosity [$\eta$] in the following tables I, II and III.

TABLE I

| No. of copolyester | Molar ratio of | | | Molar ratio of polyols | | Catalyst | | H °C. | T min | [$\eta$] dl/g | Tg °C. |
|---|---|---|---|---|---|---|---|---|---|---|---|
| | Tere | Iso | Sip | Ets | Eg | 1 | 2 | | | | |
| 1 | 53 | 40 | 7 | 0.1 | 99.9 | + | + | 255 | 70 | 0.26 | 39 |
| 2 | 53 | 40 | 7 | 1.0 | 99.0 | + | + | 255 | 65 | 0.32 | 40 |
| 3 | 53 | 40 | 7 | 2.0 | 98.0 | + | + | 255 | 90 | 0.24 | 38 |
| 4 | 53 | 40 | 7 | 5.0 | 95.0 | + | + | 255 | x | x | x |
| 5 | 53 | 40 | 7 | 5.0 | 95.0 | + | + | 255 | 110 | 0.15 | 35 |

TABLE I-continued

| No. of copoly-ester | Molar ratio of Tere | Iso | Sip | Molar ratio of polyols Ets | Eg | Catalyst 1 | 2 | H °C. | T min | [η] dl/g | Tg °C. |
|---|---|---|---|---|---|---|---|---|---|---|---|
| 6 | 53 | 40 | 7 | 5.0 | 95.0 | + | + | 245 | 180 | 0.22 | 47 |

Tere = terephthalic acid used as dimethyl ester
Iso = isophthalic acid used as dimethyl ester
Sip = 5-sulphoisophthalic acid sodium salt used as dimethyl ester
Ets = pentaerythritol in copolyesters 1–4 or glycerol in the copolyesters 5 and 6
Eg = ethylene glycol
+ means ingredient is present; x means product is crosslinked to a degree wherein no longer a solution could be obtained.
Catalyst 1 = zinc acetate .2H$_2$O
Catalyst 2 = Sb$_2$O$_3$
[η] = intrinsic viscosity measured at 25° C. in a mixture of phenol/o-dichlorobenzene (60/40 by volume)
H = temperature of the polycondensation
T = reaction time of the polycondensation.

TABLE II

| No. of copoly-ester | Molar ratio of Tere | Iso | Sip | Ac 1 | 2 | 3 | 4 | Mole % of Eg | Catalyst 1 | 2 | H °C. | T min | [η] dl/g | Tg °C. |
|---|---|---|---|---|---|---|---|---|---|---|---|---|---|---|
| 7 | 52.90 | 39.90 | 7 | + | − | − | − | 100 | + | + | 255 | 115 | 0.20 | 46 |
| 8 | 52.50 | 39.50 | 7 | + | − | − | − | 100 | + | + | 255 | 115 | 0.21 | 46 |
| 9 | 51.00 | 38.00 | 7 | + | − | − | − | 100 | + | + | 255 | 100 | 0.24 | 48 |
| 10 | 52.50 | 39.50 | 7 | − | + | − | − | 100 | + | + | 255 | 140 | 0.21 | 45 |
| 11 | 52.50 | 39.50 | 7 | − | − | + | − | 100 | + | + | 255 | 180 | 0.21 | 40 |
| 12 | 52.75 | 39.75 | 7 | − | − | − | + | 100 | + | + | 255 | 160 | — | 45 |

Tere = terephthalic acid used as dimethyl ester
Iso = isophtalic acid used as dimethyl ester
Sip = 5-sulphoisophthalic acid sodium salt used as dimethyl ester
Eg = ethylene glycol
Ac 1, 2, 3 and 4 were used in an amount to make 100 mole % of the acid constituents
Ac 1 = trimesic acid used as trimethylester
Ac 2 = trimellitic anhydride
Ac 3 = pyromellitic acid used as tetramethyl ester
Ac 4 = 3,3',4,4' benzophenone tetracarboxylic acid used as tetramethyl ester
Catalyst 1 = zinc acetate .2H$_2$O
Catalyst 2 = Sb$_2$O$_3$
+ means ingredient present; − means ingredient absent.
[η] = intrinsic viscosity measured at 25° C. in a mixture of phenol/o-dichlorobenzene (60/40 by volume)
H = temperature of the polycondensation
T = reaction time of the polycondensation.

TABLE III

| No. of copoly-ester | Molar ratio of Tere | Iso | Sip | Poly | Mole % of Eg | Catalyst 1 | 2 | H °C. | T min | [η] dl/g | Tg °C. |
|---|---|---|---|---|---|---|---|---|---|---|---|
| 13 | 52.99 | 39.99 | 7 | 0.02 | 100 | + | + | 255 | 130 | 0.29 | 42 |
| 14 | 52.97 | 39.97 | 7 | 0.05 | 100 | + | + | 255 | 130 | 0.25 | 50 |
| 15 | 52.95 | 39.95 | 7 | 0.1 | 100 | + | + | 255 | 130 | 0.25 | 58 |
| 16 | 52.85 | 39.85 | 7 | 0.3 | 100 | + | + | 255 | 80 | 0.21 | 59 |
| 17 | 52.50 | 39.50 | 7 | 1.0 | 100 | + | + | 255 | 55 | 0.20 | 54 |
| 18 | 52.00 | 39.00 | 7 | 2.0 | 100 | + | + | 255 | 65 | 0.21 | 51 |
| 19 | 53.00 | 40.00 | 7 | — | 100 | + | + | 255 | 240 | 0.235 | 35 |

Tere = terephthalic acid used as dimethyl ester
Iso = isophthalic acid used as dimethyl ester
Sip = 5-sulphoisophthalic acid sodium salt used as dimethyl ester
Poly = polycarboxylic acid used as methyl ester of the following structural formula A:

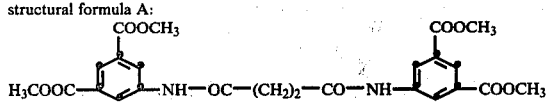

Eg = ethylene glycol
+ means ingredient present;
− means ingredient absent.
[η] = intrinsic viscosity measured at 25° C. in a mixture of phenol/o-dichlorobenzene (60/40 by volume)
H = temperature of the polycondensation
T = reaction time of the polycondensation.

The copolyesters 14 to 17 are suited for use according to the present invention. The copolyester 13 has a too low Tg value and shows a too high stickiness for use in the production of a subbing layer. The copolyester 18 yields an opalescent aqueous dispersion which on coating and drying forms a mat layer. Similar results were obtained by using a polycarboxylic acid ester having the following structural formula B:

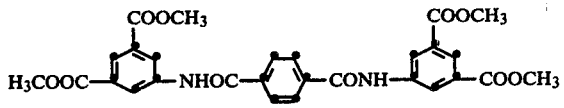

The present invention is illustrated by the following examples without, however, limiting it thereto. The ratios and percentages are by weight unless otherwise indicated.

EXAMPLE 1

Polyethylene terephthalate was melt-extruded at about 280° C. from a slot die onto a rotating drum on which it was quenched to about 75° C. to form a film having a thickness of 1.2 mm. The cooled film was coated at both sides at a coverage of 1 liter per 50 sq.m with the following coating mixture:

| | |
|---|---|
| 20% aqueous dispersion of copolyester No. 17 of Table III | 900 ml |
| 10% aqueous solution of ULTRAVON W (trade name of Ciba-Geigy A.G., Switzerland, for the disodium salt of 2-heptadecylbenzimidazole disulphonic acid) | 5 ml |
| SYTON W3 (trade name of Monsanto Chemical Company, St. Louis, Mo., U.S.A. for a 30% colloidal dispersion of silica in water (average particle size 120 nm) | 6 ml |
| water up to | 1000 ml |

After drying the primed film was longitudinally stretched at about 84° C. with a draw ratio of 3.5:1 and immediately thereupon cooled in water as described in the European Patent Application No. 80/200,305.3 filed Apr. 3, 1980 by Agfa-Gevaert N.V.

To both sides of the thus stretched film a layer was applied in a ratio of 1 liter per 100 sq.m from the following coating composition:

| | |
|---|---|
| gelatin | 25 g |
| malonic acid | 10 g |
| 10% aqueous solution of AMBITERIC H (trade name of GLOVERS CHEM. LTD. for a 85% by weight aqueous solution of | 10 g |

$$R_1\text{—}{}^+\!N\text{—}R_3\text{—}COO^-$$
$$\underset{R_4}{\overset{R_2}{|}}$$

| | |
|---|---|
| ($R_1 = C_8$-$C_{18}$ alkyl each of $R_2$ and $R_4$ = lower alkyl, $R_3$ = lower alkylene), | |
| urea-formaldehyde-coated silica particles having an average particle size of 2 μm and being prepared as described in the published European Patent Application 79/200053.1 | 0.8 g |
| water up to | 1000 ml |

The pH of the coating composition was adjusted to 8 with ammonia.

After drying with a hot air-stream the coated film was stretched to 3.5 times in the transverse direction at about 80° C. and heat-set while kept under tension at 220° C. for about 10 s. After heat-setting the subbed film was cooled and wound up on a core.

The film had finally a thickness of about 0.10 mm and was optically clear. The thus double-side subbed polyester film was provided at one side with a gelatino-antihalation layer and at the other side with a gelatin-silver halide emulsion layer as used in the manufacture of a photographic material for application in the graphic arts.

The adhesion in dry state was checked before and after processing (development, rinsing, fixing and washing). The gelatin-containing silver halide emulsion layer was scratched cross-wise by means of a sharp knife, whereafter an adhesive tape that had been pressed thereon was torn off at once. The quality of adhesion prooved to be particularly good because only very small pieces of the photographic layer were torn off.

The adhesion in wet state was checked by scratching the material superficially and trying to rub off the gelatin layer with a finger after each step of the photographic processing (development, rinsing, fixing, rinsing). The gelatin layer was not rubbed off.

EXAMPLE 2

A melt-extruded amorphous polyethylene terephthalate film having a thickness of 2.2 mm was coated at both sides at a coverage of 1 liter per 50 sq.m with the following coating mixture:

| | |
|---|---|
| 20% aqueous dispersion of copolyester No.17 of Table III | 900 ml |
| 10% aqueous solution of ULTRAVON W (trade name) | 5 ml |
| water up to | 1000 ml |

After drying the primed film was longitudinally stretched at about 84° C. with a draw ratio of 3.5:1 already mentioned and immediately thereupon cooled in water as described in the European Patent Application No. 80/200305.3

To both sides of the thus stretched film a layer was applied in a ratio of 1 liter per 100 sq.m from the following coating composition:

| | |
|---|---|
| gelatin | 25 g |
| malonic acid | 4 g |
| sorbitol | 10 ml |
| 10% aqueous solution of ULTRAVON W (trade name) | 10 ml |
| water up to | 1000 ml |

The pH of the coating composition was adjusted to 8 with ammonia.

The film was further treated as described in Example 1 and had finally a thickness of 0.180 mm.

The double-side subbed polyester film was provided at both sides with a gelatin-silver halide emulsion layer as used in X-ray film. The adhesion was tested as described in Example 1 and analogous results of adhesion in dry and wet state were obtained.

EXAMPLE 3

A melt-extruded amorphous polyethylene terephthalate film having a thickness of 1.4 mm was single-side coated at a coverage of 1 liter per 60 sq.m with the following coating mixture:

| | |
|---|---|
| 25% aqueous dispersion of copolyester No. 17 of Table III | 900 ml |
| 10% aqueous solution of ULTRAVON W (trade name) | 6 ml |
| SYTON W-30 (trade name) | 6 ml |
| water up to | 1000 ml |

The pH of the coating composition was adjusted to 8 with ammonia.

After drying the primer layer the film was longitudinally stretched at a draw of 3.5:1. Thereupon a subbing layer was applied to the primer layer at a coverage of 1 liter per 100 sq.m from the following coating composition:

| | |
|---|---|
| gelatin | 50 g |
| malonic acid | 2 g |
| 10% aqueous solution of AMBITERIC H (trade name) | 15 ml |
| water up to | 1000 ml |

The pH of the coating composition was adjusted up to 8.

To the non-subbed side an anti-static layer was applied as described in Example 4 of the U.S. Pat. No. 4,089,997 of August Jean Van Paesschen and Lucien Janbaptist Van Gossum, issued May 16, 1978.

After drying with a hot air-stream and transverse stretching as in Example 1 the film had finally a thickness of 0.12 mm. The subbed side of the film was coated with a gelatin-silver halide emulsion layer suited for the production of black-and-white ciné film.

The adhesion in dry and wet state was tested as described in Example 1 and showed to be good.

We claim:

1. A subbed polyester film comprising a polyester film base and directly affixed thereto a dried subbing layer of a copolyester applied from an aqueous dispersion and derived from ethylene glycol and an acid mixture consisting essentially of 20-60 mole % of isophthalic acid, 6-10 mole % of sulphoisophthalic acid whose sulpho group is in salt form, 0.05 to 1 mole % of an aromatic polycarboxylic acid compound having at least three carboxylic acid groups which is not capable of forming intramolecularly an anhydride and includes at least two carboxylated aromatic nuclei, and the balance of terephthalic acid, said copolyester having a glass transition temperature of at least 50° C. and an intrinsic viscosity of from 0.15 to 0.45 dl/g when measured at 25° C. in a mixture of phenol/o-dichlorobenzene in a ratio of 60/40 by volume.

2. Polyester film according to claim 1, wherein sulpho group is represented by —SO₃M wherein M is an alkali metal or an onium group.

3. Polyester film according to claim 1 wherein said copolyester has an intrinsic viscosity of from 0.20 to 0.45 dl/g, measured at 25° C. in a mixture of phenol/o-dichlorobenzene in a ratio of 60/40 by volume, and the dispersed phase of said dispersion is formed of particles having an average particle size not larger than 50 nm.

4. Polyester film according to claim 1, wherein said aromatic polycarboxylic acid compound is a polycarboxylic acid compound having at least four carboxylic acid groups which is not capable of forming intramolecularly an anhydride.

5. Polyester film according to claim 4, wherein said aromatic polycarboxylic acid compound corresponds to the following general formula:

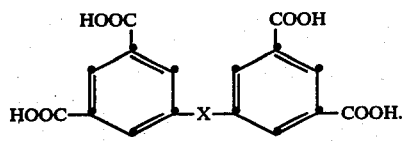

wherein X represents a chemical bond or a bivalent atom or bivalent group of atoms including oxygen, alkylene, carbonyl, sulphonyl, —NHSO₂—, —NH-CONH— or a —NH—Q—Y—Q—NH— group wherein Q represents carbonyl or sulphonyl and Y represents a bivalent organic group.

6. Polyester film according to claim 1, wherein the dispersion contains the copolyester in a concentration of at least 20% by weight.

7. Polyester film according to claim 1, where the dispersion contains a surface-active coating agent, colloidal silica, an embossing agent and/or an adhesion-improving agent.

8. Polyester film according to claim 1, wherein said film base is longitudinally stretched after the coating and drying of said dispersion.

9. Polyester film according to claim 8, comprising an additional subbing layer essentially consisting of gelatin and a plasticizing agent therefor and superimposed upon said first subbing layer.

10. Polyester film according to claim 8, comprising a further layer superimposed on said subbing layer and containing a polymer or copolymer containing free carboxylic acid groups and serving as binder material for a dye or pigment.

11. Polyester film according to claim 9, comprising an exterior photographic gelatin-containing silverhalide emulsion layer.

* * * * *